(12) United States Patent
Woodworth (10) Patent No.: US 11,358,341 B2
(45) Date of Patent: Jun. 14, 2022

(54) SUPPORT ASSEMBLY AND METHOD FOR SUPPORTING A PART

(71) Applicant: THE BOEING COMPANY, Chicago, IL (US)

(72) Inventor: Michael Mosteller Woodworth, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 158 days.

(21) Appl. No.: 16/509,702

(22) Filed: Jul. 12, 2019

(65) Prior Publication Data

US 2021/0008807 A1 Jan. 14, 2021

(51) Int. Cl.
*B29C 64/40* (2017.01)
*B33Y 10/00* (2015.01)
*B23Q 1/03* (2006.01)

(52) U.S. Cl.
CPC .............. *B29C 64/40* (2017.08); *B23Q 1/03* (2013.01); *B33Y 10/00* (2014.12)

(58) Field of Classification Search
CPC ......... B33Y 10/00; B33Y 30/00; B29C 64/40; B29C 64/20; B29C 64/245; B23Q 1/03
See application file for complete search history.

(56) References Cited

U.S. PATENT DOCUMENTS

2016/0175932 A1\* 6/2016 Dimter ................... B23K 37/04
                                                                    219/76.1
2017/0371317 A1\* 12/2017 Share ..................... B33Y 50/02
2018/0126655 A1\* 5/2018 Tyler .................... B29C 64/393

\* cited by examiner

*Primary Examiner* — Joseph S Del Sole
*Assistant Examiner* — Jamel M Nelson
(74) *Attorney, Agent, or Firm* — The Small Patent Law Group LLC; Philip S. Hof (57) ABSTRACT

A support assembly includes a part and a tension support rod. The part is additively manufactured on a base plate and includes a series of stacked layers of material fused together. The tension support rod is attached to the base plate at a first attachment location and is attached to the part at a second attachment location. At least one of the first attachment location or the second attachment location comprises a pivot joint to enable movement of the tension support rod at the pivot joint.

21 Claims, 5 Drawing Sheets

SUPPORT ASSEMBLY AND METHOD FOR SUPPORTING A PART

FIELD OF EMBODIMENTS OF THE DISCLOSURE

Embodiments of the present disclosure generally relate to a support assembly for additive manufacturing, such as for supporting a part being additively manufactured.

BACKGROUND OF THE DISCLOSURE

Additive manufacturing of parts typically involves the selective deposition of successive layers of material and fusing the layers together via the application of an energy source, such as a laser, which heats the material. As deposited layers of a part cool, the material composition may cause the layers to thermally contract (or shrink) and/or distort due to temperature gradients and/or phase changes from liquid to solid, which vary across different sections of the part. For example, the temperature at the top of the part having a newly formed layer may be significantly greater than a section of the part closer to the bottom, which may cause internal stress and strain. The internal stresses may cause irregularities in the part.

Tension support rods may be utilized during the additive manufacturing process to reduce deformation and hold the shape of the part. For example, a tension support rod may extend from a base plate (or other rigid structure) of the manufacturing machine to the part, such as an overhanging section of the part, to mechanically link the part to the base plate. The tension support rod may also provide a heat sink for dissipating heat from the part to the base plate. The tension support rod is typically rigidly fixed to the part and the base plate. However, contraction of the layers of the part during the layer-by-layer build process may accumulate stress and strain on the tension support rod, which may eventually affect the tension support rod, and lead to irregularities in the part. The irregularities of the part may interfere with the build process, such as by obstructing the movement of a re-coater or spreader device of the additive manufacturing machinery. Excessive deformation of the part may also result in the part being labeled as non-conforming, requiring the part to be scrapped.

SUMMARY OF THE DISCLOSURE

A need exists for a system and method of efficiently supporting an additively manufactured part during a build process to ensure that the part does not interfere with the build process and that the completed part conforms to a target shape. Further, a need exists for an adaptable, cost-efficient solution for addressing the internal stress and strain that accumulates from thermal gradients as the part cools, to reduce the likelihood of irregularities forming in the part.

With those needs in mind, certain embodiments of the present disclosure provide a support assembly that includes a part that is additively manufactured on a base plate and a tension support rod. The part includes a series of stacked layers of material fused together. The tension support rod is attached to the base plate at a first attachment location and is attached to the part at a second attachment location. At least one of the first attachment location or the second attachment location comprises a pivot joint to enable movement of the tension support rod at the pivot joint.

In at least one embodiment, the part includes an overhang portion and the second attachment location is at an underside of the overhang portion facing towards the base plate.

In at least one embodiment, the pivot joint is a first pivot joint disposed at the first attachment location between the tension support rod and the base plate, and the additive manufacturing assembly further includes a second pivot joint disposed at the second attachment location between the tension support rod and the part.

In at least one embodiment, the pivot joint includes an end of the tension support rod and a socket that is affixed to the part or the base plate. The socket defines a cavity that accommodates the end of the tension support rod. The socket includes a series of stacked layers of material fused together. Optionally, the cavity is sized larger than the end of the tension support rod to define a clearance space between an outer surface of the end of the tension support rod and an inner surface of the socket that defines the cavity.

In at least one embodiment, the pivot joint includes a socket located at an end of the tension support rod and a protrusion that is affixed to the part or the base plate. The socket of the tension support rod defines a cavity that accommodates the protrusion. The protrusion includes a series of stacked layers of material fused together.

Certain embodiments of the present disclosure provide a method for supporting a part. The method includes additively manufacturing a part on a base plate and forming a tension support rod that is attached to the base plate at a first attachment location and attached to the part at a second attachment location. At least one of the first attachment location or the second attachment location includes a pivot joint to enable movement of the tension support rod at the respective pivot joint.

Certain embodiments of the present disclosure provide a support assembly that includes a part that is additively manufactured on a base plate and a tension support rod. The part includes an overhang portion with an underside thereof facing towards the base plate. The tension support rod extends between the base plate and the overhang portion to secure the overhang portion to the base plate. The tension support rod has a first end and a second end opposite the first end. The first end is pivotally coupled to the base plate within a socket of the base plate to define a first pivot joint. The second end is pivotally coupled to the overhang portion within a socket of the overhang portion to define a second pivot joint. The first pivot joint and the second pivot joint enable the tension support rod to rotate relative to the base plate and the part, respectively.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide systems and methods for efficiently supporting three-dimensional parts during an additive manufacturing build process that forms the three-dimensional parts. Additive manufacturing refers to any process for manufacturing a three-dimensional object in which successive layers of base material are deposited under computerized control. For example, the size and shape of the object may be based on a three-dimensional computer model or another electronic data source. Additive manufacturing can be used to fabricate objects that have complex structures and/or shapes. Additive manufacturing techniques for fabricating metal objects may be less labor intensive, may allow greater design freedom, and may yield more precise and repeatable finished products than conventional metal manufacturing techniques, such as die-casting, extruding, and the like.

The support assembly and method described herein enable production of additively-manufactured parts, including metallic parts, of various shapes and sizes with a reduced risk of distortion and/or cracks in the parts relative to conventional build techniques. The support assembly and method may ensure that the additively-manufactured parts do not interfere with the build process due to warping and that the completed parts conform to target shapes within a designated threshold or standard compliance. The support assembly and method may provide an adaptable, cost-efficient solution for reducing the likelihood of tension support rods failing due to stress and strain caused by thermal gradients as the layers cool.

The support assembly and method may be configured to reduce torque within the tension support rods that are used to mechanically tie the parts to a base plate during the build process. The torque is reduced by utilizing a pivot joint at one or both of the connection points between the tension support rod and the connecting members (e.g., the part and the base plate). Relative to a rigid connection, the pivot joint is configured to enable the tension support rod to rotate along at least one degree of freedom relative to the respective connecting member attached to the pivot joint. By utilizing pivot joints at one or both of the connection points, the tension support rod effectively functions as a two-force member, such that the only forces on the rod are directed along the length (e.g., tension and compression). The pivot joints reduce or eliminate peak twisting-related stress at the ends of the rod, significantly reducing the risk of the rod failing due to the contracting layers of the part. As a result, the tension support rods disclosed herein are able to perform the designated functions of retaining the shape of the part and dissipating heat throughout the build process.

Figure 1:
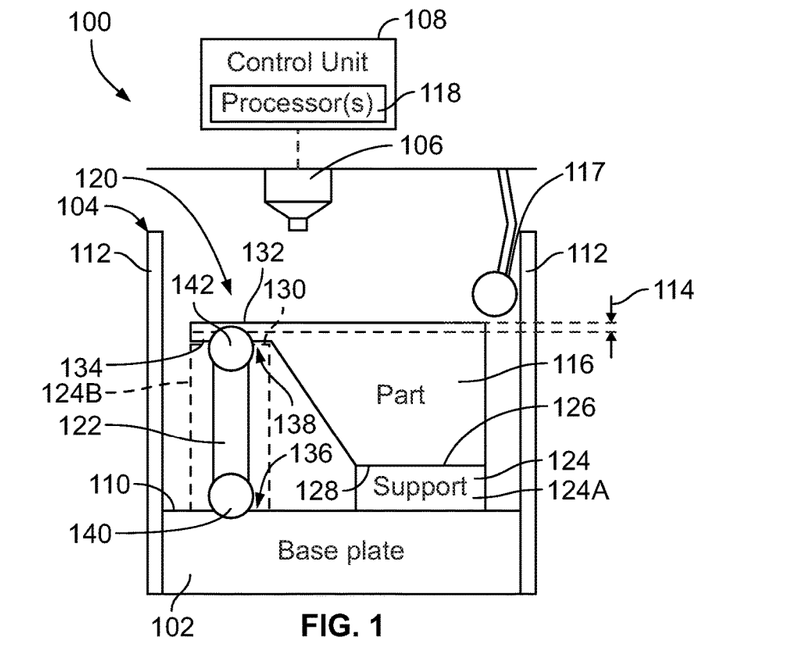
FIG. 1 is a schematic illustration of an additive manufacturing system according to an embodiment of the present disclosure.

FIG. 1 is a schematic illustration of an additive manufacturing system 100 according to an embodiment. The additive manufacturing (AM) system 100 includes a base plate 102, an enclosure 104, an electromagnetic energy source 106, and a control unit 108. The AM system 100 is configured to perform additive manufacturing build processes to form three-dimensional parts. The parts are built up from a top surface 110 of the base plate 102 by selecting depositing a source material in successive layers and fusing the source material at designated locations according to programmed instructions. The electromagnetic energy source 106 may be controlled by the control unit 108 to emit electromagnetic energy towards the source material on the part to fuse designated portions of the source material to the part, forming a new or top layer 114 of the part.

The AM system 100 may be utilized to perform selective laser melting (or sintering) for building a part 116 within a powder bed. For example, the part 116 being built on the base plate 102 may be encased within the powder bed. The AM system 100 includes walls 112 that surround the part 116 to contain the powder bed. New layers of the part 116 may be generated by spreading a thin layer or stratum of powder, as a source material, over the top of the part 116. The electromagnetic energy source 106 is suspended above the top of the powder bed and is movable relative to the power bed according to control signals received from the control unit 108. The part 116 may be generated layer-by-layer in a successive sequence by the electromagnetic energy source 106 emitting electromagnetic energy beams that impinge upon the stratum of the powder, causing a selected portion of the stratum to adhere to the part 116 and form the new or top layer 114 thereof. Selective laser melting is one potential additive manufacturing process with which the support assembly and method described herein may be utilized, but the support assembly and method may also be utilized with other types of additive manufacturing processes.

The AM system 100 may also include a source material applicator 117 that deposits material for each successive layer of the build. The source material applicator 117 may include or represent a spreader or re-coater device that spreads a thin layer of powder, an injector that injects material, or the like. The source material may be stored in a reservoir prior to use.

In one or more embodiments, the source material that forms the part 116 includes one or more metals. For example, the source material may be a powder containing metal particles. The powder optionally may also include non-metallic filler materials intermixed with the metal particles. The metal particles may include various metal types, such as aluminum, stainless steel, copper, nickel, cobalt, titanium, or the like, and alloys of the various metal types. Possible non-metallic filler materials within the powder may include ceramics, polymers (e.g., plastics), silica, or the like.

The electromagnetic energy source 106 may represent or include a laser beam generator, an electron beam generator, or the like. For example, in an embodiment in which the electromagnetic energy source 106 is a laser beam generator, the electromagnetic energy source 106 generates and emits laser beams. The laser beams are controlled to have sufficient energy to promote melting and/or fusing of the powder onto the part. The laser beam generator may be a fiber laser in a non-limiting example. In an embodiment in which the electromagnetic energy source 106 is an electron beam generator, the electromagnetic energy source 106 generates and emits electron beams. The electron beam generator optionally may be a single crystalline cathode, multi-beam device. The electromagnetic energy source 106 optionally may also include one or more lenses, collimators, mirrors, and/or the like for directing the energy beams, such as laser beams or electron beams, towards different selected areas of the base plate 102. The electromagnetic energy source 106 is operably connected to the control unit 108 via a wired or wireless communication pathway. The control unit 108 communicates electrical signals to the electromagnetic energy source 106 to control the timing and intensity of energy beams that are generated and emitted during the build process, as well as to guide and direct the locations at which the energy beams impinge upon the powder.

The control unit 108 includes one or more processors 118 that are configured to operate based on programmed instructions. The control unit 108 may include additional features or components, such as a data storage device (e.g., memory), an input/output (I/O) device, and/or a wireless communication device. The memory may store programmed instructions (i.e., software) that is dictates the functioning of the one or more processors 118. For example, the memory may store a data file, such as a CAD file, associated with the part that is being fabricated. The control unit 108 (e.g., the one or more processors 118 thereof) may control the operations of the electromagnetic energy source 106 based on the instructions in the data file to produce the part 116 as a replica of a digital object in the data file. The control unit 108 may also control other devices during the build process, such as a spreader or re-coater device that spreads the powder into each successive stratum on top of the part 116 and/or a valve that controls the deposition of powder in the enclosure 104 from a powder reservoir.

Optionally, all or at least a subset of the components of the AM system 100 shown in FIG. 1 may be contained within or mounted on a housing (not shown) to define a unitary additive manufacturing machine. The additive manufacturing machine may be sized to fit on a desk or on the floor.

In an embodiment, the AM system 100 includes a support assembly 120 that includes the part 116 being built and one or more support members for supporting the part 116. The support members may include tension support rod 122, block supports 124, or both. In an embodiment, the tension support rod 122 and the block supports 124 are additively formed. In an example, the supports 122, 124 are formed during the same build process that forms the part 116. The tension support rod 122, the block supports 124, and the part 116 are all composed of a series of stacked material layers that are fused together during an additive manufacturing build process.

The block supports 124 are used to mechanically support lateral extensions of the part, referred to herein as overhang portions. The top surfaces of the block supports 124 provide a base on which the initial layers of the overhang portions are deposited. The block supports 124 may have a mesh or lattice geometry which enables the block supports 124 to act as scaffolding for providing a build surface. The tension support rod 122 is configured to retain the shape of the part 116 during the build process by mechanically securing (e.g., tethering) one or more portions of the part 116 to the base plate 102 to prevent or at least prohibit or reduce deformation of the part 116 as the part 116 cools. The tension support rod 122 functions like a strut to resist warping of projecting or overhanging portions. The tension support rod 122 is an elongated bar or shaft that is solid or at least partially hollow. The tension support rod 122 and the block supports 124 may also function as heat sinks to dissipate heat from the part 116. For example, the tension support rod 122 and the block supports 124 may provide thermally conductive paths from the part 116 to the base plate 102. After completing the build process, the block supports 124 and tension support rod 122 are configured to be separated from the part 116, such as via a machining operation.

In the illustrated embodiment, the support assembly 120 includes both a tension support rod 122 and two block supports 124A, 124B, but the support assembly 120 may have additional tension support rods 122 and/or additional block supports 124 depending on the size, complexity, shape, material composition, and/or the like of the part to be formed. All three of the illustrated supports 122, 124A, 124B are built directly on the top surface 110 of the base plate 102. The part 116 is built directly on a top surface 126 of the block support 124A, such that the block support 124A is disposed between a bottom side 128 of the part 116 and the base plate 102. The block support 124B is spaced apart from the block support 124A. A top surface 130 of the block support 124B provides a build platform for an overhang portion 132 of the part 116. For example, an underside 134 of the overhang portion 132 is built directly on the top surface 130. The underside 134 faces towards the base plate 102. The block support 124B is shown in phantom in FIG. 1 to show the tension support rod 122, which extends at least partially through an interior of the block support 124B in the illustrated embodiment.

The tension support rod 122 is attached to the base plate 102 at a first attachment location 136 and is attached to the part 116 at a second attachment location 138. In the illustrated embodiment, the second attachment location 138 is at the underside 134 of the overhang portion 132. The tension support rod 122 longitudinally extends a length from a first end 140 of the rod 122 to a second end 142 of the rod 122 that is opposite the first end 140. The first end 140 is disposed at the first attachment location 136. The second end 142 is disposed at the second attachment location 138. As described above, based on the attachment locations 136, 138, the tension support rod 122 tethers the overhang portion 132 of the part 116 to the base plate 102. The tension support rod 122 is configured to hold the overhang portion 132 to retain the shape and prevent warping and/or cracking of the overhang portion 132 as the layers of material cool.

Within examples, one or more of the first attachment location 136 and the second attachment location 138 comprises a pivot joint to enable movement of the tension support rod at the pivot point. A pivot joint is disposed at one or both of the first attachment location 136 and the second attachment location 138, as shown and described in more detail below. Each pivot joint enables movement of the tension support rod 122 while maintaining the mechanical connection of the rod 122 to the corresponding base plate 102 or part 116.

Figure 2:
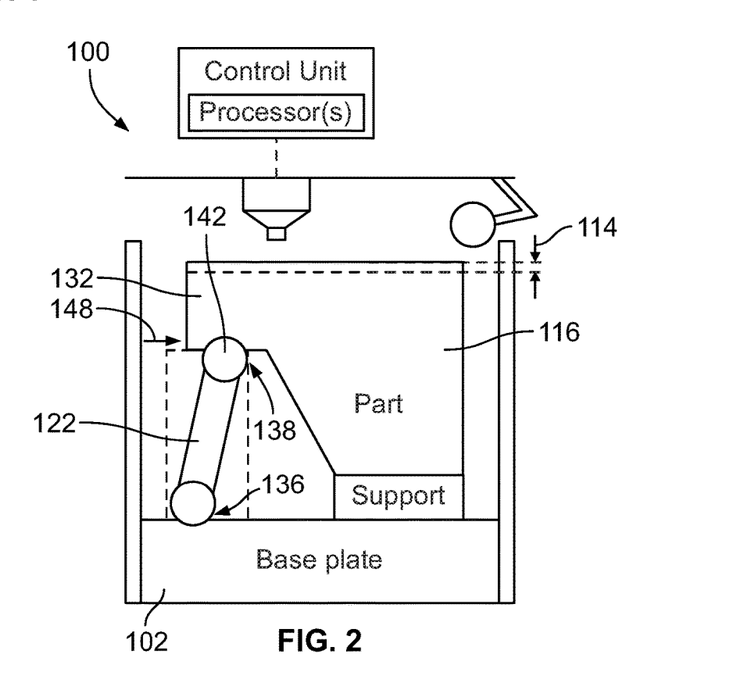
FIG. 2 is a schematic illustration of the additive manufacturing system shown in FIG. 1 at a subsequent stage of the build process relative to the stage depicted in FIG. 1.

FIG. 2 is a schematic illustration of the additive manufacturing system 100 shown in FIG. 1 at a subsequent stage of the build process relative to the stage depicted in FIG. 1. In FIG. 1, the tension support rod 122 and the two block supports 124A, 124B are fully formed and the overhang portion 132 is beginning to be formed. For example, the top layer 114 of the part 116 in FIG. 1 is slightly above the second (or top) end 142 of the tension support rod 122. In the later stage depicted in FIG. 2, several additional layers have been fused to the part 116 along the overhang portion 132 such that the top layer 114 is now spaced a significant height above the second end 142 of the tension support rod 122.

As the newly-deposited and fused layers of the part 116 cool, the layers contract towards a center of the part 116. The contraction of the layers pulls the second end 142 of the tension support rod 122 (at the second attachment location 138) in a lateral direction 148 towards the center of the part 116. The contraction of the layers is expected due to the high temperatures involved to fuse the material and the thermal expansion/contraction properties of the material.

In conventional arrangements, the thermal gradients along the different layers of material at different stages in the cooling process accumulate strain within tension support rods because the tension support rods are rigidly fixed to the base plate and the part. For example, a force on a conventional tension support rod similar to the force applied on the second end 142 of the rod 122 in the direction 148 would encourage bending, twisting, and/or rotation of the rod in the clockwise direction, but the connections do not permit such movement of the rod. Eventually, the tension support rods may fail due to the internal stresses and strains, such as by peeling apart from the base plate, peeling apart from the part, cracking, or the like. After the tension support rod fails, the part is permitted to warp and deform, which may require the part to be scrapped for non-conformity with the desired product.

In the embodiments described herein, due to the presence of the pivot joint or joints at one or both of the attachment locations 136, 138, the tension support rod 122 is permitted to rotate relative to the base plate 102 and/or the part 116. Therefore, as the layers of the part 116 contract and pull the second end 142 in the lateral direction 148, the rod 122 is permitted to rotate from the orientation shown in FIG. 1 to the orientation shown in FIG. 2. For example, the second end 142 is able to move with the overhang portion 132 as the contracting layers pull the overhang portion 132 and the second end 142 towards a lateral center of the part 116. Although the rod 122 moves relative to the position shown in FIG. 1, the rod 122 remains mechanically secured to both the base plate 102 and the part 116 to continue providing tension on the overhang portion 132 to restrict warping. The rod 122 may also continue to function as a heat sink to convey heat from the part 116 to the base plate 102. By allowing the rod 122 to rotate, the one or two pivot joints reduce or eliminate internal stress and strain on the rod 122 due to torque (e.g., twisting forces), eliminating or at least significantly alleviating the risk of the rod 122 failing. The change in angular orientation of the rod 122 between the orientations shown in FIGS. 1 and 2 may be exaggerated for illustrative purposes.

Figure 3:
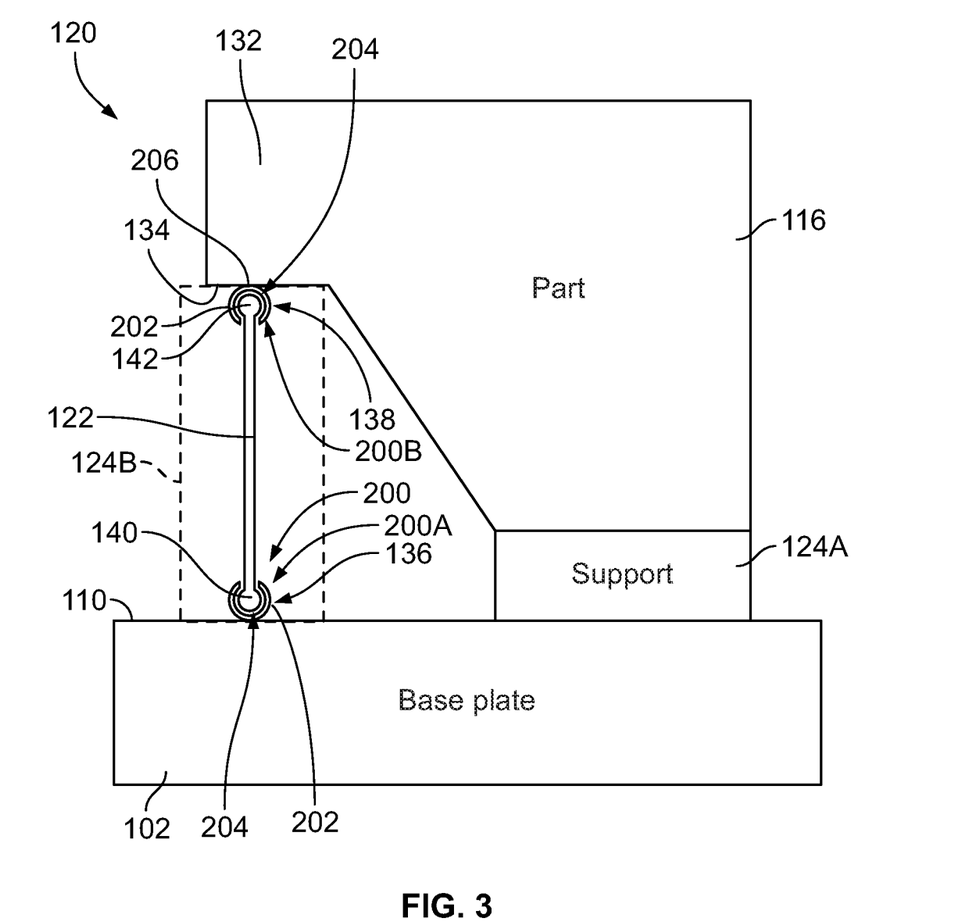
FIG. 3 is a schematic illustration of the support assembly on the base plate according to an embodiment of the present disclosure.

FIG. 3 is a schematic illustration of the support assembly 120 on the base plate 102 according to an embodiment. The support assembly 120 includes the part 116 that is being built, the tension support rod 122, and the two block supports 124A, 124B, as shown in FIGS. 1 and 2. In the illustrated embodiment, the support assembly 120 includes a respective pivot joint 200 at each of the first and second attachment locations 136, 138 of the tension support rod 122. A first pivot joint 200A at the first attachment location 136 connects the first end 140 of the rod 122 to the base plate 102. A second pivot joint 200B at the second attachment location 138 connects the second end 142 of the rod 122 to the part 116, and more specifically the overhang portion 132 thereof. The rod 122 extends linearly from the first pivot joint 200A to the second pivot joint 200B.

The pivot joints 200A, 200B permit the rotation of the tension support rod 122 relative to both the base plate 102 and the part 116. For example, the rod 122 may be permitted by the pivot joints 200A, 200B to rotate from the orientation of the rod 122 shown in FIG. 1 to the orientation of the rod 122 shown in FIG. 2. By allowing the rod 122 to rotate, the moment carrying responsibility of the rod 122 may be eliminated, enabling the rod 122 to function as a two-force member with a uniform stress along the length of the rod 122. The two-force member indicates that the rod 122 only experiences forces exerted parallel to the length of the rod 122 (e.g., tension and contraction), not twisting forces. Because the rod 122 does not have to withstand twisting forces (e.g., torques), the rod 122 may be able to be constructed thinner than the rod 122 would be conventionally constructed because there is less risk of the rod 122 bending or snapping.

Each of the pivot joints 200A, 200B includes a socket 202 that defines a cavity 204. The socket 202 of the first pivot joint 200A is affixed to the top surface 110 of the base plate 102. The cavity 204 of the socket 202 of the first pivot joint 200A is sized and shaped to accommodate the first end 140 of the tension support rod 122. Thus, the first pivot joint 200A is defined by the socket 202 and first end 140 of the rod 122, and provides a pivotal coupling between the rod 122 and the base plate 102. The socket 202 of the second pivot joint 200B is affixed to the underside 134 of the overhang portion 132 of the part 116. The cavity 204 of the socket 202 of the second pivot joint 200B is sized and shaped to accommodate the second end 142 of the rod 122. Thus, the second pivot joint 200B is defined by the socket 202 and second end 142 of the rod 122, and provides a pivotal coupling between the rod 122 and the part 116.

The sockets 202 are configured to retain the corresponding ends 140, 142 of the rod 122 within the respective cavities 204 to maintain the mechanical connections between the rod 122 and the corresponding connecting members, either the base plate 102 or the part 116. In an example, the rod 122 includes a protrusion or a bulbous knob at the ends 140, 142 thereof for retaining the ends 140, 142 within the corresponding sockets 202.

In one or more embodiments, the pivot joints 200A, 200B are additively manufactured during the build process that builds the part 116. For example, the socket 202 of the first pivot joint 200A is composed of a series of stacked layers of material successively deposited and fused together, similar to the part 116, the tension support rod 122, and the block supports 124A, 124B. The initial layer of the socket 202 may be deposited directly on the top surface 110 of the base plate 102. The socket 202 may be fused to the base plate 102 to rigidly affix the socket 202 to the base plate 102. The socket 202 of the second pivot joint 200B is also composed of a series of stacked layers of material fused together. For example, the initial layer of the overhang portion 132 that defines the underside 134 may be deposited directly on a top surface 206 of the socket 202 to fuse and rigidly affix the socket 202 to the overhang portion 132. The tension support rod 122 is also additively manufactured in layers, such that the ends 140, 142 of the rod 122 may be formed in-situ within the cavities 204 of the sockets 202 concurrently with the formation of the sockets 202. For example, a given layer of powder may be selectively energized to fuse a first portion of the layer onto the pre-existing portion of the socket 202 of the first pivot joint 200A and to fuse a second portion of the same layer onto the pre-existing portion of the first end 140 of the rod 122.

After the additive manufacturing build process to form the part 116 is complete, the tension support rod 122, the block supports 124A, 124B, and the pivot joints 200A, 200B (e.g., the sockets 202) may be removed. For example, the socket 202 of the second pivot joint 200B may be machine-separated from the underside 134 of the overhang portion 132 of the part 116. In an alternative embodiment, the support assembly 120 includes the first pivot joint 200A or the second pivot joint 200B, but not both. For instance, in an example where the support assembly includes the first pivot joint 200A or the second pivot joint 200B, but not both, the end of the rod 122 that is spaced apart from the pivot joint 200 is rigidly fixed to the corresponding connecting member (e.g., the base plate 102 or the part 116) by fusing that end to the connecting member during the additive manufacturing build process.

Figure 4:
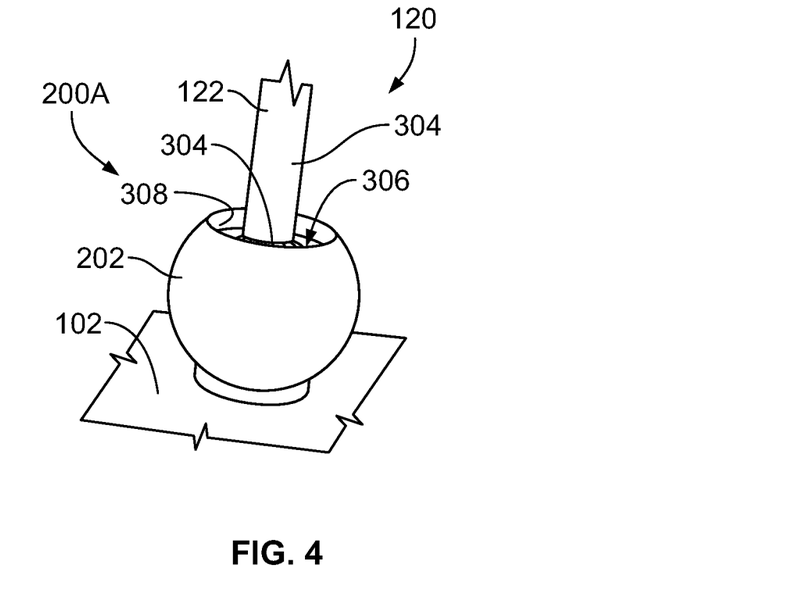
FIG. 4 is a perspective view of a portion of the support assembly showing a first pivot joint according to the embodiment shown in FIG. 3.
Figure 5:
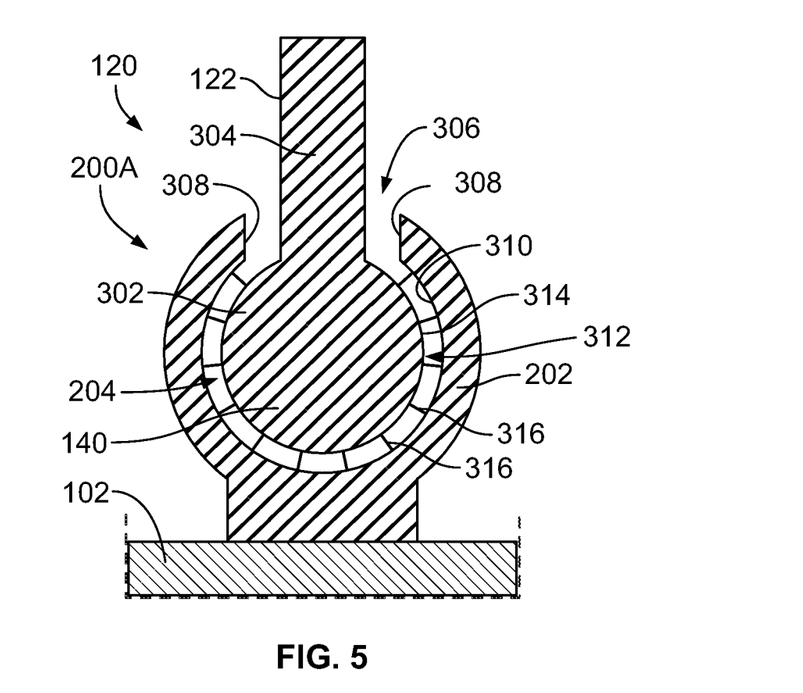
FIG. 5 is a cross-sectional view of the portion of the support assembly shown in FIG. 4.

FIG. 4 is a perspective view of a portion of the support assembly 120 showing the first pivot joint 200A according to the embodiment shown in FIG. 3. FIG. 5 is a cross-sectional view of the portion of the support assembly 120 shown in FIG. 4. In the illustrated embodiment, the end 140 of the tension support rod 122 has a bulbous knob 302 that has a greater width than a stem 304 of the rod 122 from which the knob 302 extends. The knob 302 may be rounded, such as spherical. The socket 202 defines a cavity 204 that is spherical and partially-open. For example, the socket 202 defines an opening 306 that is fluidly connected to the spherical cavity 204. The opening 306 has a smaller dimension than the diameter of the spherical cavity 204. The spherical cavity 204 is sized large enough to accommodate the knob 302. The stem 304 of the rod 122 protrudes out of the cavity 204 through the opening 306. The opening 306 is sized larger than the width (e.g., thickness) of the stem 304 to permit space for the rod 122 to pivot within the socket 202 without the stem 304 immediately abutting edges 308 of the socket 202 that define the opening 306. The opening 306 is sized smaller than the diameter of the knob 302 to retain the knob 302 in the cavity 204. In an embodiment, the knob 302 is able to be located in the cavity 204 (although the opening 306 is too small to permit the knob 302) because the knob 302 is formed in-situ concurrently with the formation of the socket 202 during an additive manufacturing build process.

In the illustrated embodiment, the pivot joint 200A represents a ball and socket joint. For example, the tension support rod 122 is permitted to rotate relative to the socket 202 along multiple degrees of freedom. The ball and socket joint may be useful if the direction in which the rod 122 is pulled by the contracting layers of the part 116 is not known or not accurately determined because the ball and socket permits movement in multiple directions. The permitted rotational range of the rod 122 relative to the socket 202 may be restricted by the size of the opening 306 relative to the width or thickness of the stem 304, as described above. The second pivot joint 200B (shown in FIG. 3) at the other end 142 (FIG. 3) of the tension support rod 122 optionally may also be a ball and socket joint. For example, the second pivot joint 200B may have the same or substantially similar size, shape, and/or construction as the first pivot joint 200A.

The cavity 204 is defined by an inner surface 310 of the socket 202. The cavity 204 is sized larger than the knob 302 at the end 140 of the tension support rod 122 such that a clearance space 312 is defined between the inner surface 310 and an outer surface 314 of the knob 302 (e.g., the end 140). The clearance space 312 extends around a majority of the circumference of the knob 302. For example, the socket 202 circumferentially surrounds a majority (e.g., greater than 50%) of the outer surface 314 of the knob 302. The clearance space 312 provides room for the rod 122 to move, such as rotate, within the cavity 204 relative to the socket 202.

In the illustrated embodiment, the pivot joint 200A includes multiple mechanical ligaments 316 that extend across the clearance space 312. Each ligament 316 extends from the outer surface 314 of the knob 302 (or end 140) of the rod 122 to the inner surface 310 of the socket 202 to mechanically connect the knob 302 to the socket 202. The ligaments 316 may be thin wires, filaments, or other thin structures. The ligaments 316 shown in FIG. 5 are spaced apart at different locations along a perimeter of the knob 302 (or end 140). FIG. 5 shows the ligaments 316 along a single depth plane of the joint 200A, but the joint 200A may include additional ligaments 316 located at different depths, such that the ligaments 316 are spaced apart from one another in three dimensions.

The ligaments 316 may aid in the construction of the knob 302 at the end 140 of the rod 122 during the additive manufacturing process. Because both the socket 202 and the rod 122 may be additively manufactured during a common build process in which the components are gradually built up starting from the bottom, the ligaments 316 located at the bottom of the cavity 204 (e.g., opposite the opening 306) effectively provide a support scaffold or web for forming the initial layers of the rod 122 at the end 140. Thus, the ligaments 316 are also produced during the additive manufacturing process. The ligaments 316 enable the knob 302 of the rod 122 to be formed spaced apart from the inner surface 310 to define the clearance space 312. Optionally, the ligaments 316 may be sufficiently thin and/or pliable that the ligaments 316 do not prohibit rotation of the knob 302 within the cavity 204. For example, the ligaments 316 may be configured to sever or detach in response to rotation of the knob 302, or the ligaments 316 may merely bend, deflect, and/or compress to accommodate such movement without severing.

Figure 6:
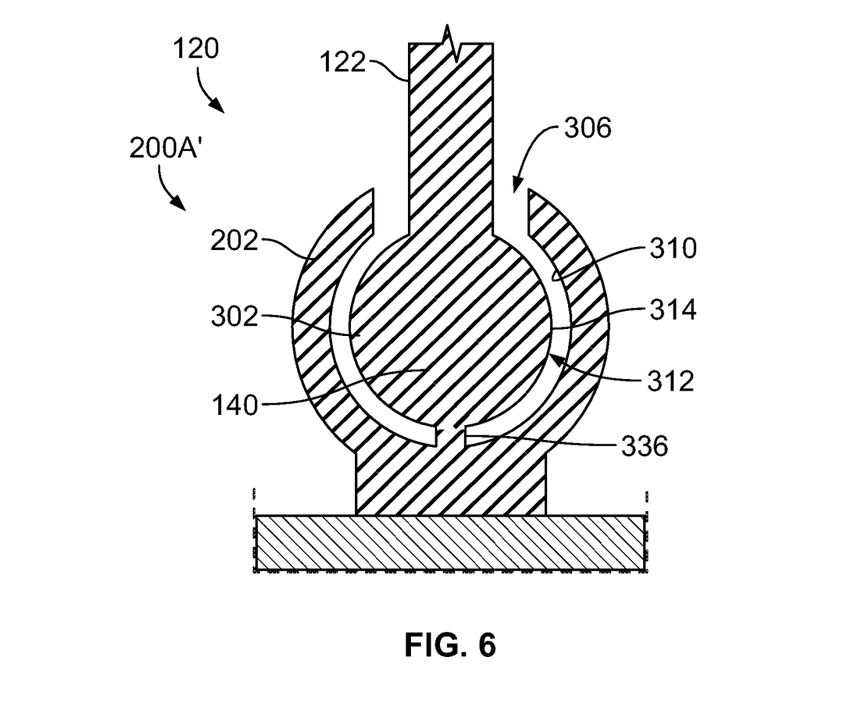
FIG. 6 is a cross-sectional view of a portion of the support assembly showing the first pivot joint according to a second embodiment of the present disclosure.

FIG. 6 is a cross-sectional view of a portion of the support assembly 120 showing the first pivot joint according to a second embodiment. The pivot joint 200A' in FIG. 6 lacks the multiple ligaments 316 in the clearance space 312 that are shown in FIG. 5. The pivot joint 200A' has a single mechanical ligament 336 in the illustrated embodiment. The knob 302 at the end 140 of the tension support rod 122 may be only mechanically tethered to the socket 202 via the ligament 336, which extends across the clearance space 312 from the outer surface 314 of the knob 302 to the inner surface 310 of the socket 202. The ligament 336 is located at the bottom or back of the cavity 204, located opposite to the opening 306. The ligament 336 provides an initial build surface for additively building the tensions support rod 122 during the additive manufacturing build process. The ligament 336 may be sufficiently thin and/or pliable to permit rotation of the knob 302 relative to the socket 202 during use, such as by severing, bending (e.g., deflecting), and/or compressing.

Figure 7:
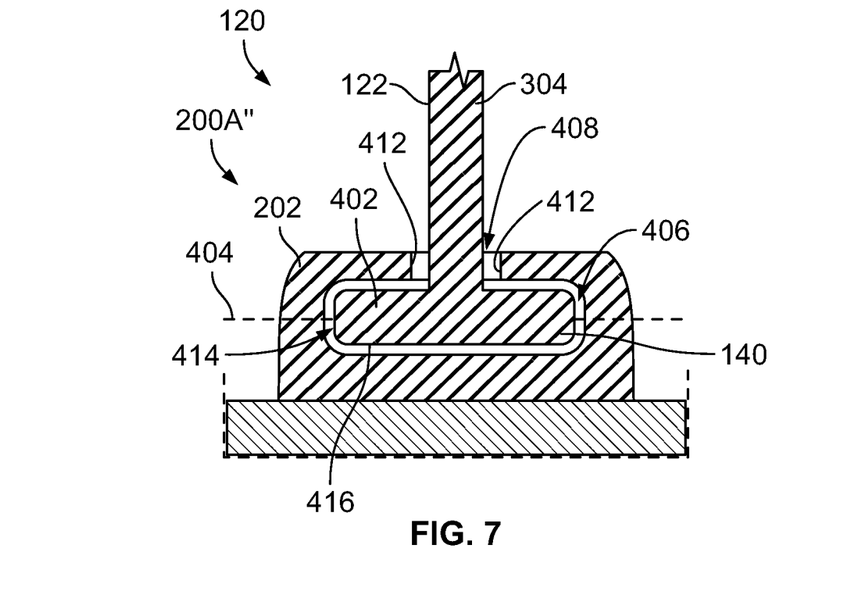
FIG. 7 is a cross-sectional view of a portion of the support assembly showing the first pivot joint according to a third embodiment of the present disclosure.

FIG. 7 is a cross-sectional view of a portion of the support assembly 120 showing the first pivot joint according to a third embodiment. In FIG. 7, the pivot joint 200A" is not a ball and socket joint and has fewer degrees of freedom for rotation of the tension support rod 122 relative to the ball and socket joints shown in FIGS. 4 through 6. The end 140 of the rod 122 includes a pin 402 that is elongated transverse to the length of the rod 122 (from the end 140 to the opposite end 142 shown in FIG. 3). The pin 402 may be elongated along a pin axis 404 that is perpendicular to the length of the rod 122 in the cross-sectional plane. The pin 402 may be any elongated, non-spherical protrusion, such as a cylinder, a tab, or the like. The socket 202 of the pivot joint 200A" defines an elongated channel 406 that accommodates and retains the pin 402. The channel 406 may represent the cavity. The channel 406 is elongated parallel to the pin axis 404. The stem 304 of the rod 122 protrudes out of the socket 202 through an opening 408.

In the illustrated embodiment, the pivot joint 200A" permits the tension support rod 122 to rotate relative to the socket 202 about the pin axis 404. For example, in the illustrated cross-section, the stem 304 of the rod 122 can rotate or pivot into the page and out of the page about the axis 404, restricted only by edges 412 of the socket 202 defining the opening 408. As described above with respect to the embodiments shown in FIGS. 5 and 6, the channel 406 may be sized larger than the pin 402 to define a clearance space 414 that allows the pin 402 to move within the channel 406. The pivot joint 200A" may include one or more mechanical ligaments 416 that extend across the clearance space 414 to provide a build surface on which to form the end 140 of the rod 122 during the additive manufacturing process.

Figure 8:
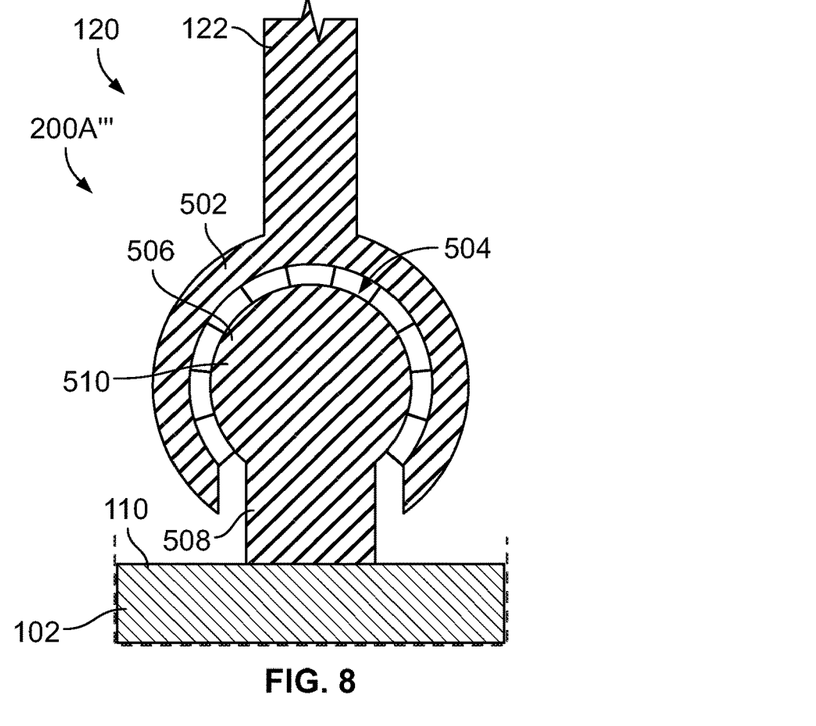
FIG. 8 is a cross-sectional view of a portion of the support assembly showing the first pivot joint according to a fourth embodiment of the present disclosure.

FIG. 8 is a cross-sectional view of a portion of the support assembly 120 showing the first pivot joint according to a fourth embodiment. The fourth embodiment shown in FIG. 8 is similar to the first embodiment shown in FIG. 5 except that the components of the pivot joint 200A''' are reversed. For example, the end 140 of the tension support rod 122 has a socket 502 that defines a cavity 504. The pivot joint 200A''' also includes a protrusion 506 that is affixed to the top surface 110 of the base plate 102. The protrusion 506 optionally includes a stem 508 directly attached to the top surface 110 and a bulbous knob 510 at the end of the stem 508 such that the stem 508 is between the base plate 102 and the knob 510. The cavity 504 of the socket 502 accommodates and retains the knob 510 therein. The knob 510 and cavity 504 may be spherical to define a ball and socket joint with multiple degrees of freedom. Alternatively, the knob 510 and cavity 504 may be elongated in a depth direction (into and out of the page) as shown in the embodiment of FIG. 7. In an embodiment, the protrusion 506 is additively manufactured during the build process such that the protrusion 506 includes a series of stacked layers of material fused together.

Although the embodiment of the pivot joint 200A' shown in FIG. 8 is the reverse of the first embodiment shown in FIG. 5, it is recognized that the embodiments shown in FIGS. 6 and 7 optionally may also be reversed to have the rod 122 include the socket and a protrusion affixed to the base plate 102.

Optionally, any of the pivot joints shown in FIGS. 4 through 8 may be utilized for either of the two pivot joints 200A, 200B shown in FIG. 3. For example, both pivot joints 200A, 200B may have the construction shown in FIG. 6. Optionally, the first pivot joint 200A in FIG. 3 may have a different construction than the second pivot joint 200B. For example, the first pivot joint 200A may have the construction of the joint shown in FIGS. 4 and 5, and the second pivot joint 200B may have the reverse construction shown in FIG. 8.

In the one or more embodiments, the components disposed directly or indirectly on the base plate 102 may be additively manufactured during a single build process. For example, the tension support rod 122 (including the knob or socket ends thereof), the pivot joints 200 (including the sockets and the protrusion 506 thereof), the block supports 124, and the like, may be additively manufactured, such as by the AM system 100 shown in FIG. 1. These components optionally may be composed of the same source material, which may include one or more metals.

Figure 9:
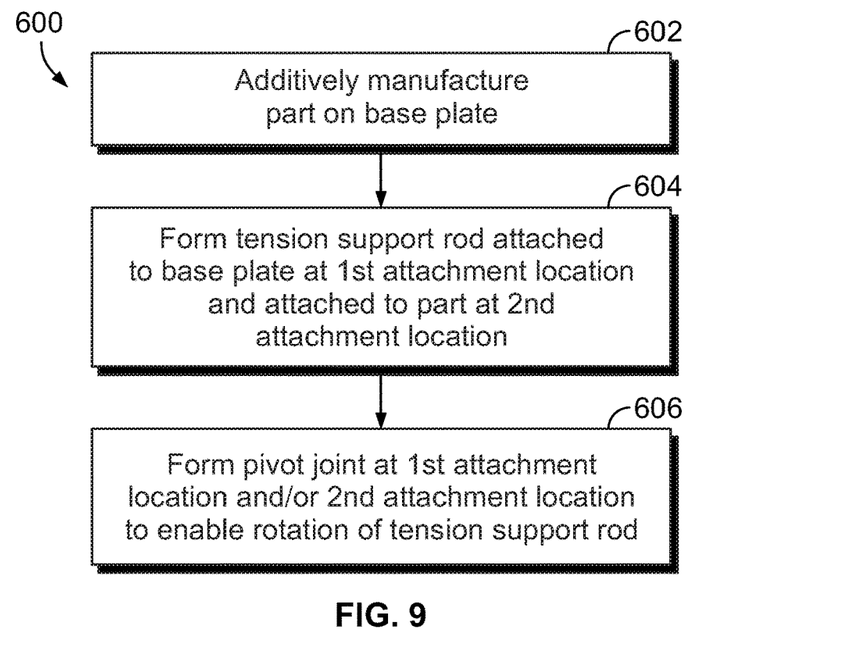
FIG. 9 is a flow chart of a method for supporting a part according to an embodiment of the present disclosure.

FIG. 9 is a flow chart of a method 600 for supporting a part according to an embodiment of the present disclosure. The method 600 may be performed in whole, or at least in part, by the control unit 108 (e.g., the one or more processors 118) of the AM system 100 shown in FIG. 1. Various embodiments of the method 600 may include additional steps not shown in FIG. 9, fewer steps than shown in FIG. 9, and/or different steps than the steps shown in FIG. 9. The method 600 is described with reference to the embodiments shown in FIGS. 1 through 8. At block 602, the method involves additively manufacturing a part 116 on a base plate 102. At block 604, the method involves forming a tension support rod 122 that is attached to the base plate 102 at a first attachment location 136 and is attached to the part 116 at a second attachment location 138. Optionally, the second attachment location 138 is at an underside 134 of an overhang portion 132 of the part 116. Optionally, the tension support rod 122 is additively manufactured by fusing a series of successively stacked layers of material together.

In an example, forming a tension support rod that is attached to the base plate at a first attachment location and attached to the part at a second attachment location comprises forming, at one or more of the first attachment location and the second attachment location, a pivot joint to enable movement of the tension support rod at the pivot joint. At block 606, a pivot joint 200 is formed at the first attachment location 136, at the second attachment location 138, or at both the first and second attachment locations 136, 138. Each pivot joint 200 enables movement (e.g., rotation) of the rod 122 at the pivot joint 200. Optionally, a respective pivot joint 200 is formed at each of the first and second attachment locations 136, 138, respectively, such that a first pivot joint 200A is at the first attachment location 136 between the rod 122 and the base plate 102 and a second pivot joint 200B is at the second attachment location 138 between the rod 122 and the part 116.

Optionally, the at least one pivot joint 200 is formed to include a socket 202 that is affixed to the part 116 or the base plate 102 (depending on the attachment location of the pivot joint 200). The socket defines a cavity 204 that accommodates a corresponding end 140, 142 of the tension support rod 122. The socket 202 may be additively manufactured, such that it is formed by fusing a series of successively stacked layers of material together. The part 116, the tension support rod 122, and the socket 202 may be formed during a common additive manufacturing process.

Optionally, the tension support rod 122 may be formed to include a socket 502 located at a corresponding end 140, 142 of the tension support rod 122. The socket 502 defines a cavity 504, and the corresponding pivot joint 200 is formed such that a protrusion 506 affixed to the part 116 or the base plate 102 is disposed within the cavity 504 of the socket 502.

Optionally, the at least one pivot joint 200 is formed to include a socket 202 having an inner surface 310 defining a cavity 204 that accommodates a corresponding end 140, 142 of the tension support rod 122. The pivot joint 200 is formed to include at least one mechanical ligament 316, 336 that extends from an outer surface 314 of the end 140, 142 of the rod 122 across a clearance space 312 to the inner surface 310 of the socket 202. The at least one mechanical ligament 316, 336 may be sufficiently pliable to enable the end 140, 142 of the rod 122 to rotate relative to the socket 202.

As described herein, embodiments of the present disclosure provide systems and methods of efficiently forming additively-manufactured parts that satisfy size and shape conformity standards. The utilization of a pivot joint at one or both attachment locations of each tension support rod enables rotation of the tension support rod due to contraction of the layers of the part as the layers cool. The pivot joint(s) enable the tension support rod to adjust to the contracting part without experiencing significant internal strain or stress, such that the tension support rod can function as a two-force member to retain the shape of the part. The tension support rod is also able to continue providing a thermal conduction path to dissipate heat from the part.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A support assembly comprising:
a part that is additively manufactured on a base plate of an additive manufacturing system, the part comprising a series of stacked layers of material fused together; and
a tension support rod attached to the part at a first attachment location and attached to the base plate at a second attachment location, wherein the first attachment location comprises a pivot joint that includes a socket to enable relative movement between the tension support rod and the part at the pivot joint.

2. The support assembly of claim 1, wherein the part includes an overhang portion and the first attachment location is at an underside of the overhang portion facing towards the base plate.

3. The support assembly of claim 1, wherein the pivot joint is a first pivot joint and the support assembly further includes a second pivot joint disposed at the second attachment location between the tension support rod and the base plate.

4. The support assembly of claim 1, wherein the socket is affixed to the part and defines a cavity that accommodates an end of the tension support rod therein, wherein the socket comprises a series of stacked layers of material fused together.

5. The support assembly of claim 1, wherein the tension support rod comprises a series of stacked layers of material fused together.

6. The support assembly of claim 1, wherein the socket is located at an end of the tension support rod and the pivot joint further comprises a protrusion that is affixed to the part or the base plate and comprises a series of stacked layers of material fused together, the socket of the tension support rod defining a cavity that accommodates the protrusion.

7. The support assembly of claim 1, wherein the socket is affixed to the part and defines a spherical cavity that is partially-open, wherein an end of the tension support rod has a bulbous knob that is retained in the spherical cavity and the tension support rod protrudes through an opening of the socket.

8. The support assembly of claim 1, wherein the socket is affixed to the part and defines an elongated channel, wherein an end of the tension support rod has a pin that is elongated transverse to a length of the tension support rod and is disposed within the elongated channel of the socket, the pin configured to pivot within the elongated channel.

9. The support assembly of claim 1, wherein the socket is affixed to the part and has an inner surface defining a cavity, wherein the cavity is sized larger than an end of the tension support rod to define a clearance space between an outer surface of the end of the tension support rod and the inner surface of the socket.

10. The support assembly of claim 9, wherein the pivot joint includes multiple mechanical ligaments that extend from the outer surface of the end of the tension support rod at different locations along a perimeter of the end across the clearance space to the inner surface of the socket.

11. The support assembly of claim 9, wherein the outer surface of the end of the tension support rod is only mechanically connected to the inner surface of the socket via a single mechanical ligament that extends across the clearance space.

12. A method for supporting a part, the method comprising:
- additively manufacturing a part on a base plate by stacking a series of layers of material and fusing the layers of material together; and
- forming a tension support rod that is attached to the part at a first attachment location and attached to the base plate at a second attachment location, wherein the first attachment location comprises a pivot joint that includes a socket to enable relative movement between the tension support rod and the part at the pivot joint.

13. The method of claim 12, wherein the part includes an overhang portion and forming the tension support rod comprises attaching the tension support rod to an underside of the overhang portion at the first attachment location.

14. The method of claim 12, wherein the pivot joint is a first pivot joint and the method further comprises forming a second pivot joint at the second attachment location between the tension support rod and the base plate.

15. The method of claim 12, wherein forming the tension support rod comprises fusing a series of stacked layers of material together.

16. The method of claim 12, further comprising forming the socket on the part, the socket defining a cavity that accommodates an end of the tension support rod, wherein the socket is formed by fusing a series of stacked layers of material together.

17. The method of claim 12, wherein the part, the tension support rod, and the socket are formed during a common additive manufacturing process.

18. The method of claim 12, wherein forming the tension support rod comprises forming the socket of the pivot joint at an end of the tension support rod, the socket formed to define a cavity, and the method further comprises forming a protrusion of the pivot joint to be affixed to the part and to extend into the cavity of the socket.

19. The method of claim 12, further comprising forming the socket to have an inner surface defining a cavity that accommodates an end of the tension support rod, wherein the socket is formed to include at least one mechanical ligament that extends from an outer surface of the end of the tension support rod across a clearance space to the inner surface of the socket, wherein the at least one mechanical ligament is sufficiently pliable to enable the end of the tension support rod to rotate or pivot relative to the socket.

20. A support assembly comprising:
- a part that is additively manufactured on a base plate, the part including an overhang portion with an underside thereof facing towards the base plate; and
- a tension support rod extending between the base plate and the overhang portion to secure the overhang portion to the base plate, the tension support rod having a first end and a second end opposite the first end, the first end pivotally coupled to the base plate within a socket of the base plate to define a first pivot joint, the second end pivotally coupled to the overhang portion within a socket of the overhang portion to define a second pivot joint, wherein the first pivot joint and the second pivot joint enable the tension support rod to rotate relative to the base plate and the part, respectively.

21. The support assembly of claim 20, wherein the socket of the base plate, the socket of the overhang portion of the part, and the tension support rod are all composed of a series of stacked layers of material fused together during a common additive manufacturing process.

\* \* \* \* \*

UNITED STATES PATENT AND TRADEMARK OFFICE
CERTIFICATE OF CORRECTION

| | | |
|---|---|---|
| PATENT NO. | : 11,358,341 B2 | Page 1 of 1 |
| APPLICATION NO. | : 16/509702 | |
| DATED | : June 14, 2022 | |
| INVENTOR(S) | : Woodworth | |

It is certified that error appears in the above-identified patent and that said Letters Patent is hereby corrected as shown below:

In the Claims

In Claim 6, Column 14, Line 37, delete the phrase "or the base plate".

Signed and Sealed this
Thirtieth Day of August, 2022

Katherine Kelly Vidal
*Director of the United States Patent and Trademark Office*